United States Patent
Cho et al.

(10) Patent No.: US 11,611,067 B2
(45) Date of Patent: Mar. 21, 2023

(54) SULFUR-CARBON COMPOSITE AND LITHIUM-SULFUR BATTERY INCLUDING SAME

(71) Applicant: LG CHEM, LTD., Seoul (KR)

(72) Inventors: Eunkyung Cho, Daejeon (KR); Dongwook Koh, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 312 days.

(21) Appl. No.: 16/646,484

(22) PCT Filed: Oct. 5, 2018

(86) PCT No.: PCT/KR2018/011768
§ 371 (c)(1),
(2) Date: Mar. 11, 2020

(87) PCT Pub. No.: WO2019/088475
PCT Pub. Date: May 9, 2019

(65) Prior Publication Data
US 2020/0280052 A1    Sep. 3, 2020

(30) Foreign Application Priority Data
Nov. 3, 2017 (KR) .......................... 10-2017-0145812

(51) Int. Cl.
*H01M 4/36* (2006.01)
*H01M 4/62* (2006.01)
(Continued)

(52) U.S. Cl.
CPC ........... *H01M 4/364* (2013.01); *H01M 4/366* (2013.01); *H01M 4/38* (2013.01); *H01M 4/587* (2013.01);
(Continued)

(58) Field of Classification Search
CPC ............ H01M 4/36; H01M 4/62; H01M 4/38; H01M 4/587; H01M 10/052
See application file for complete search history.

(56) References Cited

U.S. PATENT DOCUMENTS

| | | |
|---|---|---|
| 2003/0073000 A1 | 4/2003 | Lee et al. |
| 2004/0029014 A1 | 2/2004 | Hwang et al. |
| (Continued) | | |

FOREIGN PATENT DOCUMENTS

| | | |
|---|---|---|
| CN | 104078685 A | 10/2014 |
| CN | 104241651 A | 12/2014 |
| (Continued) | | |

OTHER PUBLICATIONS

Chen et al., "Improving Lithium-Sulfur Battery Performance under Lean Electrolyte through Nanoscale Confinement in Soft Swellable Gels", Nano Lett. 2017, vol. 17, pp. 3061-3067.
(Continued)

*Primary Examiner* — Kenneth J Douyette
(74) *Attorney, Agent, or Firm* — Birch, Stewart, Kolasch & Birch, LLP

(57) ABSTRACT

A sulfur-carbon composite and a lithium-sulfur battery including the same, and in particular, to a sulfur-carbon composite including a porous carbon material; a polymer having electrolyte liquid loading capacity; and sulfur. The porous carbon material may be coated with the polymer having electrolyte liquid loading capacity and the coated porous carbon material then mixed with the sulfur. By introducing a coating layer including the polymer having electrolyte liquid loading capacity to a surface of the porous carbon material, it is possible to improve reactivity of the sulfur and an electrolyte liquid and thereby enhance performance and lifetime properties of the lithium-sulfur battery.

14 Claims, 2 Drawing Sheets

(51) Int. Cl.
  *H01M 4/58*   (2010.01)
  *H01M 10/052*   (2010.01)
  *H01M 4/38*   (2006.01)
  *H01M 4/587*   (2010.01)
  *H01M 4/02*   (2006.01)

(52) U.S. Cl.
  CPC .......... *H01M 4/62* (2013.01); *H01M 10/052* (2013.01); *H01M 2004/028* (2013.01)

(56) References Cited

U.S. PATENT DOCUMENTS

| | | | |
|---|---|---|---|
| 2008/0118836 A1 | 5/2008 | Hwang et al. | |
| 2009/0311604 A1 | 12/2009 | Nazar et al. | |
| 2013/0183548 A1* | 7/2013 | Kourtakis | H01M 4/362 252/182.1 |
| 2014/0017574 A1* | 1/2014 | Ito | H01M 4/587 429/338 |
| 2015/0044550 A1 | 2/2015 | Park et al. | |
| 2015/0221935 A1* | 8/2015 | Zhou | H01M 4/581 427/221 |
| 2015/0340696 A1 | 11/2015 | Son et al. | |
| 2016/0149216 A1 | 5/2016 | Mizuno et al. | |
| 2016/0164103 A1 | 6/2016 | Son et al. | |
| 2020/0176763 A1 | 6/2020 | Nakatani et al. | |

FOREIGN PATENT DOCUMENTS

| | | |
|---|---|---|
| CN | 104600316 A | 5/2015 |
| CN | 105359309 A | 2/2016 |
| EP | 3451425 A2 | 3/2019 |
| JP | 2003-123739 A | 4/2003 |
| JP | 2016-506055 A | 2/2016 |
| KR | 10-2004-0013585 A | 2/2004 |
| KR | 10-2005-0038899 A | 4/2005 |
| KR | 10-0786850 B1 | 12/2007 |
| KR | 10-2015-0016091 A | 2/2015 |
| KR | 10-2015-0017580 A | 2/2015 |
| KR | 10-2016-0037084 A | 4/2016 |
| KR | 10-2016-0046775 A | 4/2016 |
| KR | 10-2016-0051055 A | 5/2016 |
| WO | WO 2016/132589 A1 | 8/2016 |
| WO | WO 2018/225619 A1 | 4/2020 |

OTHER PUBLICATIONS

International Search Report for PCT/KR2018/011768 dated Mar. 14, 2019.
Extended European Search Report for European Application No. 18872133.6, dated Oct. 5, 2020.

* cited by examiner

SULFUR-CARBON COMPOSITE AND LITHIUM-SULFUR BATTERY INCLUDING SAME

TECHNICAL FIELD

This application claims the benefit of Korean Patent Application No. 10-2017-0145812, filed on Nov. 3, 2017 with the Korean Intellectual Property Office, the disclosure of which is herein incorporated by reference in its entirety.

The present invention relates to a sulfur-carbon composite and a lithium-sulfur battery including the same.

BACKGROUND ART

As electronic devices and communication devices have rapidly become smaller, lighter and more sophisticated recently, and necessity of electric vehicles has highly emerged regarding environmental problems, there have been increasing demands for improving performance and lifetime of secondary batteries used as an energy source of these products. As secondary batteries satisfying such demands, lithium-sulfur batteries using a sulfur-based compound as a positive electrode active material have received attention.

A lithium-sulfur battery is a secondary battery using a sulfur-based compound having sulfur-sulfur bonds as a positive electrode active material, and using lithium metal, a carbon-based material having intercalation/deintercalation of lithium ions or silicon, tin or the like forming an alloy with lithium as a negative electrode active material.

In a lithium-sulfur battery, a reduction reaction occurs in a positive electrode by sulfur receiving electrons and an oxidation reaction occurs in a negative electrode by lithium being ionized when discharged. Specifically, sulfur is cyclic $S_8$ before discharge, and electric energy is stored and produced using an oxidation-reduction reaction in which an oxidation number of sulfur decreases as sulfur-sulfur bonds are broken during a reduction reaction (discharge), and an oxidation number of sulfur increases as sulfur-sulfur bonds are formed again during an oxidation reaction (charge).

Particularly, a lithium-sulfur battery has theoretical discharge capacity of 1,675 mAh/g and theoretical energy density of 2,600 Wh/kg, which is theoretical energy density higher by approximately 5 times compared to currently studied lithium ion batteries (approximately 570 Wh/kg), and therefore, is a battery capable of obtaining high capacity, high energy density and long lifetime. In addition, sulfur, a main material of a positive electrode active material, has advantages of having a low atomic weight, being readily supplied by being abundant in resources, being low priced, having no toxicity and being environmental-friendly, and therefore, extensive studies have been progressed on lithium-sulfur batteries with an advantage of being usable as an energy source of medium-to-large devices such as electric vehicles as well as portable electronic devices.

Sulfur used as a positive electrode active material in a lithium-sulfur battery has electrical conductivity of $5 \times 10^-$ S/cm and is a nonconductor with no electrical conductivity, and therefore, has a problem in that electrons produced through an electrochemical reaction are difficult to migrate. As a result, sulfur has been composited with a conductive material such as carbon capable of providing an electrochemical reaction site when used.

Meanwhile, a lithium-sulfur battery has not been commercialized since sufficient performance is not secured by initial capacity and cycle lifetime rapidly decreasing as the cycle progresses in actual driving. This is due to the fact that sulfur, a positive electrode active material, has its volume expanding due to a reduction reaction, or is lost by lithium polysulfide, an intermediate product, being eluted to an electrolyte liquid during a reduction reaction, and no longer participates in a charge and discharge reaction of a battery. As a result, various technologies have been proposed in order to improve stability and electrochemical reactivity of a sulfur-carbon composite.

As one example, Korean Patent Application Publication No. 2016-0046775 discloses that, by providing a positive electrode coating layer formed with an amphipathic polymer on a part of a surface of a positive electrode active site including a sulfur-carbon composite, cycle properties of a battery may be enhanced through facilitating lithium ion migration as well as suppressing lithium polysulfide elution.

In addition, Korean Patent Application Publication No. 2016-0037084 discloses that, by coating graphene on a carbon nanotube aggregate including sulfur, lithium polysulfide being melted out is blocked, and conductivity of the sulfur-carbon nanotube composite and a loading amount of sulfur are enhanced.

Sulfur-carbon composites proposed in these patents have somewhat improved a sulfur loss problem through a coating layer, however, the effect is not sufficient in terms of stability and reactivity maintaining. Accordingly, development of sulfur-carbon composites having superior stability and electrochemical reactivity has been more required.

PRIOR ART DOCUMENTS

Patent Documents

Korean Patent Application Publication No. 2016-0046775 (2016 Apr. 29), Cathode for lithium-sulfur battery and method of preparing the same Korean Patent Application Publication No. 2016-0037084 (2016 Apr. 5), Sulfur-carbon nanotube complex, method of preparing the same, cathode active material for lithium-sulfur battery including the same and lithium-sulfur battery including the same

DISCLOSURE

Technical Problem

As a result of extensive studies in view of the above, the inventors of the present invention have identified that, by introducing a coating layer comprising a polymer having electrolyte liquid loading capacity on a porous carbon material surface, electrochemical reactivity of a sulfur-carbon composite and performance of a battery including the same are enhanced through improving accessibility and contact of an electrolyte liquid.

Accordingly, an aspect of the present invention provides a sulfur-carbon composite capable of maintaining initial capacity and lifetime properties by forming a coating layer comprising a polymer having electrolyte liquid loading capacity between a porous carbon material and sulfur.

Another aspect of the present invention provides a positive electrode including the sulfur-carbon composite, and a lithium-sulfur battery including the same.

Technical Solution

According to an aspect of the present invention, there is provided a sulfur-carbon composite comprising a porous carbon material; a polymer having electrolyte liquid loading capacity and sulfur.

The coating layer may be present on at least one selected from the group consisting of an inner surface of the porous carbon material and an outer surface of the porous carbon material, wherein the coating layer comprises the polymer having electrolyte liquid loading capacity.

The sulfur-carbon composite may be in a state in which the coating layer-formed porous carbon material is mixed with the sulfur.

The polymer may have electrolyte liquid loading capacity of 50% or greater.

The polymer having electrolyte liquid loading capacity may comprise at least one selected from the group consisting of polyurethane, polyethylene oxide, polypropylene oxide, polyvinylidene fluoride, polyvinylidene fluoride-hexafluoropropylene, polyolefin, poly(meth)acrylate, polymethyl methacrylate, polycarbonate, polymethyl carbonate, polyethyl oxazoline, polyvinyl acetate, polyvinyl chloride, polyvinyl ether and polyvinyl pyrrolidone.

The polymer having electrolyte liquid loading capacity may be included in an amount of from 0.1 parts by weight to 50 parts by weight, based on 100 parts by weight of the porous carbon material.

According to another aspect of the present invention, there is provided a positive electrode for a lithium-sulfur battery including the sulfur-carbon composite.

According to still another aspect of the present invention, there is provided a lithium-sulfur battery including the positive electrode.

Advantageous Effects

A sulfur-carbon composite according to the present invention is provided with a coating layer comprising a polymer having electrolyte liquid loading capacity on a porous carbon material surface, and is capable of improving reactivity with sulfur by keeping an electrolyte liquid to be uniform inside the composite, and as a result, performance and lifetime properties of a lithium-sulfur battery can be enhanced.

BEST MODE

Figure 1:
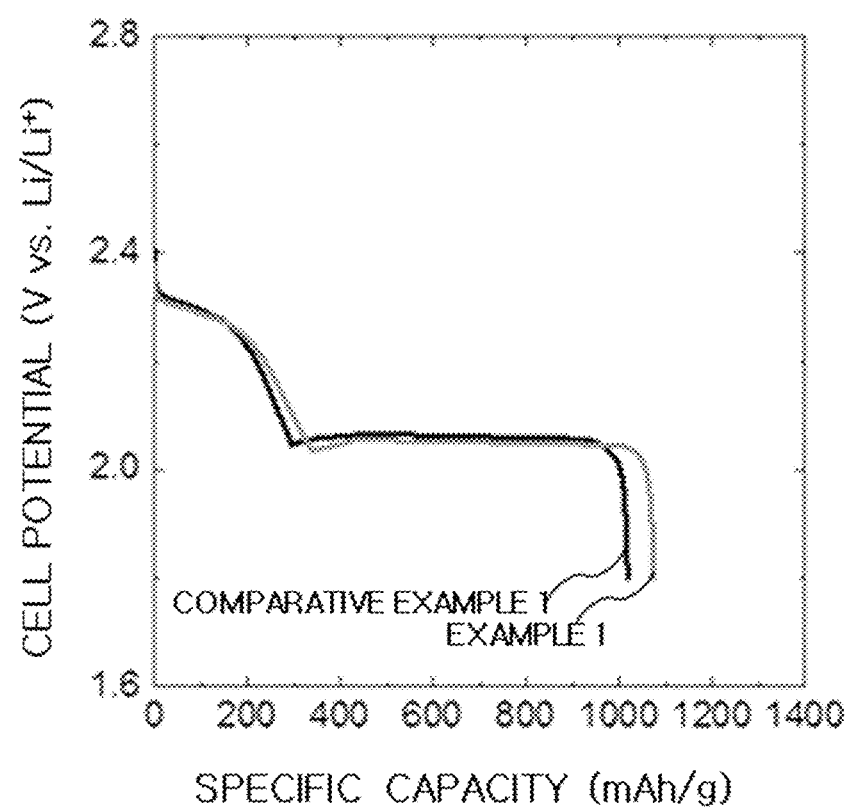
FIG. 1 is a graph showing charge and discharge capacity of a coin cell according to Experimental Example 1 of the present invention.

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present inventive. Singular forms used herein include plural forms as well, unless the context clearly indicates otherwise. In the present invention, terms such as 'include' or 'have' are to specify the presence of features, numbers, steps, behaviors, constituents, components or combinations thereof described in the specification, and need to be construed as not excluding the possibility of presence or addition of one or more of other features, numbers, steps, behaviors, constituents, components or combinations thereof.

The term "composite" used in the present specification means a material combining two or more materials, and exhibiting more effective functions while forming physically and chemically different phases.

The term "electrolyte liquid loading capacity" or "electrolyte liquid loading power" used in the present specification means an ability to contain and hold an electrolyte liquid, and is distinguished from a temporary contact or taking of the corresponding material or component in that it loads the electrolyte liquid homogeneously over a long period of time.

A lithium-sulfur battery has higher discharge capacity and theoretical energy density among many lithium secondary batteries, and has received attention as a next-generation battery with an advantage of sulfur used as a positive electrode active material being abundant in resources and low-priced, and being environmental-friendly.

However, sulfur is converted to linear-structured lithium polysulfide ($Li_2S_x$, x=8, 6, 4 and 2) from cyclic $S_8$ by a reduction reaction in a lithium-sulfur battery, and when such lithium polysulfide is completely reduced, lithium sulfide ($Li_2S$) is lastly produced. Among such lithium polysulfides, an intermediate product of a reduction reaction of sulfur, lithium polysulfide having a high sulfur oxidation number ($Li_2S_x$, normally x>4) is a material having strong polarity, and is thereby eluted out of a positive electrode reaction area by being readily dissolved in an electrolyte liquid including a hydrophilic organic solvent, and no longer participates in an electrochemical reaction. In addition, approximately 80% of volume expansion occurs by the sulfur changing to lithium sulfide ($Li_2S$), a discharge product, which causes a problem of making contact with the electrolyte liquid difficult as a void volume inside the positive electrode decreases. In addition thereto, a problem of the electrolyte liquid being decomposed and consumed occurs when driving a battery by forming a passivation layer (solid electrolyte interphase, SEI) or reacting with impurities.

Since the amount of sulfur participating in an electrochemical reaction is low with the loss of sulfur and electrolyte liquid and large changes in the positive electrode volume, a lithium-sulfur battery has, despite the above-described advantages, problems of not fully achieving theoretical capacity and energy density in actual driving and accelerating decline in the initial capacity and cycle properties after a certain cycle.

In the prior art, methods of high loading sulfur, improving mixing qualities with an electric conductor, introducing a coating layer performing a role of suppressing lithium polysulfide elution, or the like, have been used, but have not been able to effectively improve lithium-sulfur battery performance.

In view of the above, the present invention provides a sulfur-carbon composite comprising a carbon material having a coating layer formed with a polymer having electrolyte liquid loading capacity in order to improve reactivity between a sulfur-carbon composite and an electrolyte liquid, and improve capacity and cycle properties of a lithium-sulfur battery by providing a function capable of locking the electrolyte liquid inside the sulfur-carbon composite, that is, between sulfur and the carbon material.

Specifically, the sulfur-carbon composite according to the present invention comprises a porous carbon material; a polymer having electrolyte liquid loading capacity and sulfur, wherein at least any one surface of inner and outer surfaces of the porous carbon material includes a coating layer comprising the polymer having electrolyte liquid loading capacity.

The porous carbon material of the present invention includes a coating layer comprising the polymer having electrolyte liquid loading capacity on at least any one surface of the inner and outer surfaces. By the electrolyte liquid impregnated through the polymer having electrolyte liquid loading capacity being stably kept inside the sulfur-carbon composite, that is, between the sulfur and the carbon material, electrolyte liquid accessibility into the active material may be enhanced and electrochemical reactivity of the sulfur may be increased. Particularly, even when lowering an electrolyte liquid/sulfur (E/S) ratio, specifically to 3.5 or less, for enhancing battery energy density, or reducing a void volume inside a positive electrode due to lithium sulfide generation, the reaction with sulfur is continuously progressed through the impregnated electrolyte liquid present between the porous carbon material and the sulfur, and initial capacity and cycle properties of a lithium-sulfur battery may be maintained over a long period of time.

In the present invention, the polymer may have electrolyte liquid loading capacity of 50% or greater, preferably 200% or greater and more preferably 200% to 600%. Herein, the electrolyte liquid loading capacity may be measured by preparing the corresponding polymer to a film, and calculating a difference in the weight between before and after immersing on the electrolyte liquid. Specifically, the corresponding polymer is casted by being dissolved in a proper solvent, and then dried to prepare a polymer film, and as one example, the corresponding polymer may be coated in a ratio of 0.1 parts by weight to 50 parts by weight with respect to 100 parts by weight of the porous carbon material. In addition, an electrolyte liquid including a lithium salt such as LiFSI or LiTFSI and an ether-based solvent is used. The prepared polymer film is immersed for 48 hours at 25° C. so that the electrolyte liquid is impregnated into the coated polymer until saturation, and the weight herein is employed as a weight after immersion.

The polymer having electrolyte liquid loading capacity is a material that does not react with solvents used when preparing the electrolyte liquid or positive electrode slurry, and examples thereof may comprise at least one selected from the group consisting of polyurethane, polyethylene oxide, polypropylene oxide, polyvinylidene fluoride, polyvinylidene fluoride-hexafluoropropylene, polyolefin, poly(meth)acrylate, polymethyl methacrylate, polycarbonate, polymethyl carbonate, polyethyl oxazoline, polyvinyl acetate, polyvinyl chloride, polyvinyl ether and polyvinyl pyrrolidone. Preferably, the polymer having electrolyte liquid loading capacity may be polyurethane.

The polyurethane may be prepared through a reaction of a polyol and an isocyanate.

The polyol is commonly used in preparing polyurethane and is not particularly limited, and specific examples thereof may include at least one selected from the group consisting of polyether-based polyols, polyester-based polyols, polytetramethylene ether glycol polyols, polyharnstoff dispersion (PHD) polyols, amine-modified polyols and mannich polyols.

In addition, the isocyanate reacting with the polyol is commonly used in preparing polyurethane and is not particularly limited, and specific examples thereof may include at least one selected from the group consisting of hexamethylene diisocyanate (HDI), isophorone diisocyanate (IPDI), 4,4'-dicyclohexylmethane diisocyanate (H12MDI), polyethylene polyphenyl isocyanate, toluene diisocyanate (TDI), 2,2'-diphenylmethane diisocyanate (2,2'-MDI), 2,4'-diphenylmethane diisocyanate (2,4'-MDI), 4,4'-diphenylmethane diisocyanate (4,4'-MDI, monomeric MDI), polymeric diphenylmethane diisocyanate (polymeric MDI), ortho toluidine phenylmethane diisocyanate (TODI), naphthalene diisocyanate (NDI), xylene diisocyanate (XDI), lysine diisocyanate (LDI) and triphenylmethane triisocyanate (TPTI).

A weight average molecular weight ($M_w$) of the polymer having electrolyte liquid loading capacity is not particularly limited, and those commonly used in the art may be used without limit. As one example, the polymer having electrolyte liquid loading capacity may have a weight average molecular weight of from 5,000 g/mol to 4,000,000 g/mol and preferably from 100,000 g/mol to 1,000,000 g/mol.

The polymer having electrolyte liquid loading capacity may be used in an amount of from 0.1 parts by weight to 50 parts by weight and preferably in an amount of from 1 parts by weight to 25 parts by weight, based on 100 parts by weight of the porous carbon material. When the content of the polymer having electrolyte liquid loading capacity is less than the above-mentioned range, formation of the coating layer on the porous carbon material is insufficient, and a target effect of improving reactivity of the sulfur-carbon composite may not be obtained. On the other hand, the content being greater than the above-mentioned range may have an adverse effect on a positive electrode slurry preparation process, function as a positive electrode active material, and battery performance.

The porous carbon material provides a skeleton capable of uniformly and stably fixing sulfur, a positive electrode active material, and supplements electrical conductivity of sulfur to smoothly progress an electrochemical reaction.

The porous carbon material may be generally prepared by carbonizing a precursor of various carbon materials. The porous carbon material includes irregular pores therein, and the pores have an average diameter in a range of from 1 nm to 200 nm, and pore density or porosity may be in a range of from 10% to 90% of the total porous volume. When the pores have an average diameter of less than the above-mentioned range, the pore size is merely a molecular level making sulfur impregnation impossible, and when the pores have an average diameter of greater than the above-mentioned range, mechanical strength of the porous carbon is weakened, which is not preferred to be used in an electrode preparation process.

The form of the porous carbon material may be a globular type, a rod type, a needle type, a plate type, a tube type or a bulk type, and may be used without limit as long as it is commonly used in a lithium-sulfur battery.

The porous carbon material may be used without limit as long as it is a material having a porous structure or a high specific surface area and commonly used in the art. Examples of the porous carbon material may comprise at least one selected from the group consisting of graphite; graphene; carbon black such as denka black, acetylene black, ketjen black, channel black, furnace black, lamp black or thermal black; carbon nanotubes (CNT) such as single-walled carbon nanotubes (SWCNT) or multi-walled carbon nanotubes (MWCNT); carbon fibers such as graphite nanofibers (GNF), carbon nanofibers (CNF) or activated carbon fibers (ACF); natural graphite, artificial graphite, expanded graphite and activated carbon, but are not limited thereto. The porous carbon material may preferably be a carbon nanotube.

The sulfur may comprise at least one selected from the group consisting of inorganic sulfur ($S_8$), $Li_2S_n$ ($n \geq 1$), disulfide compounds such as 2,5-dimercapto-1,3,4-thiadiazole or 1,3,5-trithiocyanuic acid, organosulfur compounds and carbon-sulfur polymers (($C_2S_x)_n$, x=2.5 to 50, $n \geq 2$). Preferably, inorganic sulfur ($S_8$ may be used.

In the sulfur-carbon composite according to the present invention, a weight ratio of the porous carbon material including the described above coating layer and sulfur may be from 1:9 to 5:5 and preferably from 2:8 to 3:7. When the weight ratio is less than above-mentioned range, an added amount of a binder required to prepare positive electrode slurry increases as the porous carbon material content increases. Such an increase in the added amount of a binder resultantly increases sheet resistance of an electrode performing a role of an insulator preventing electron migration (electron pass), and cell performance may decline therefrom. On the contrary, when the weight ratio is greater than the above-mentioned range, sulfurs aggregate by themselves, and direct participation in an electrode reaction may become difficult since the sulfur is difficult to receive electrons.

In addition, in the present invention, the sulfur-carbon composite may include sulfur:porous carbon material:polymer having electrolyte liquid loading capacity in a weight ratio of from 50 to 90:6 to 45:0.01 to 15. When the composition ratio in the sulfur-carbon composite corresponds to the above-mentioned range, the effects of improving electrochemical reactivity and stability of the sulfur-carbon composite described above may be secured.

In addition, in the sulfur-carbon composite according to the present invention, the sulfur is located on at least any one surface of inner and outer surfaces of the pores of the porous carbon material, and herein, may be present in a region of less than 100%, preferably from 1% to 95% and more preferably from 60% to 90% of the whole inner and outer surface of the porous carbon material. When the sulfur is present on the porous carbon material surface in the above-mentioned range, maximum effects may be obtained in terms of electron transfer area and liquid electrolyte wettability. Specifically, the sulfur is thinly and evenly impregnated on the porous carbon material surface in the region of above-mentioned range, and therefore, an electron transfer contact area may increase in a charge and discharge process. When the sulfur is located in a 100% region of the whole porous carbon material surface, the porous carbon material is completely covered with sulfur reducing electrolyte wettability, and reducing contact with a conductor included in an electrode, and as a result, electrons are not transferred and participation in the reaction becomes impossible.

The sulfur-carbon composite of the present invention may further include a conductive material.

The conductive material is not particularly limited as long as it has conductivity without inducing chemical changes to a battery. As examples of the conductive material, carbon black such as Super-P, denka black, acetylene black, ketjen black, channel black, furnace black, lamp black or thermal black; carbon derivatives such as carbon nanotubes or fullerene; conductive fibers such as carbon fibers or metal fibers; fluorocarbon; metal powders such as aluminum and nickel powder; or conductive polymers such as polyaniline, polythiophene, polyacetylene or polypyrrole may be used either alone or as a mixture.

In addition, the present invention provides a method for preparing the sulfur-carbon composite.

The method for preparing the sulfur-carbon composite according to the present invention is not particularly limited, and methods commonly known in the art may be used.

The method for preparing the sulfur-carbon composite according to the present invention may comprise the steps of (a) coating a porous carbon material with a polymer having electrolyte liquid loading capacity and (b) mixing the porous carbon material coated with the polymer having electrolyte liquid loading capacity prepared in (a) with sulfur, and molding the result.

The forming of a coating layer on the porous conductor surface with a polymer having electrolyte liquid loading capacity may be performed through processes of introducing a porous conductor to a solution in which a polymer having electrolyte liquid loading capacity is dissolved, stirring the result, and then filtering and drying the result, however, any method known in the art may be used.

The step (b) may be performed through processes of mixing the porous carbon material coated with the polymer having electrolyte liquid loading capacity with sulfur, and heating and molding the result, however, any method known in the art may be used.

The mixing is for enhancing the degree of mixing between the materials described above, and may be carried out using a stirring device commonly used in the art. Herein, the mixing time and rate may also be selectively controlled depending on the raw material content and the condition.

The heating temperature may be any temperature as long as it is a temperature melting sulfur, and specifically, may be from 120° C. to 180° C. and preferably from 150° C. to 180° C. When the heating temperature is lower than 120° C., sulfur is not sufficiently melted, and the sulfur-carbon composite structure may not be properly formed, and when the temperature is greater than 180° C., the coated polymer may not remain making it difficult to obtain target effects. In addition thereto, the heating time may be controlled depending on the sulfur content.

Through the preparation method described above, a sulfur-carbon composite having a coating layer comprising a polymer having electrolyte liquid loading capacity between a porous carbon material and sulfur may be prepared, and by the sulfur-carbon composite loading an electrolyte liquid thereinto through the coating layer formed between the porous carbon material and the sulfur, electrochemical reactivity of the sulfur and the electrolyte liquid increases, which may enhance battery performance by maintaining initial capacity and cycle lifetime properties of the battery over a long period of time.

In addition, the present invention provides a positive electrode for a lithium-sulfur battery including the sulfur-carbon composite.

The sulfur-carbon composite may be included in the positive electrode as a positive electrode active material.

The positive electrode may further include one or more additives selected from among transition metal elements, group IIIA elements, group IVA elements, sulfur compounds of these elements, and alloys of these elements and sulfur, in addition to the positive electrode active material.

As the transition metal element, Sc, Ti, V, Cr, Mn, Fe, Co, Ni, Cu, Zn, Y, Zr, Nb, Mo, Tc, Ru, Rh, Pd, Os, Ir, Pt, Au, Hg or the like may be included. As the group IIIA element, Al, Ga, In, Ti or the like may be included, and as the group IVA element, Ge, Sn, Pb or the like may be included.

The positive electrode may further include, together with the positive electrode active material, or selectively with the additives, an electrically conductive material for smoothly migrating electrons in the positive electrode, and a binder for favorably attaching the positive electrode active material on a current collector.

The conductive material is not particularly limited as long as it has conductivity without inducing chemical changes to a battery, and as the conductive material, carbon black such as Super-P, denka black, acetylene black, ketjen black, channel black, furnace black, lamp black, thermal black or carbon black; carbon derivatives such as carbon nanotubes or fullerene; conductive fibers such as carbon fibers or metal fibers; fluorocarbon; metal powders such as aluminum and nickel powder; or conductive polymers such as polyaniline, polythiophene, polyacetylene or polypyrrole may be used either alone or as a mixture.

The conductive material may be added in an amount of from 0.01% by weight to 30% by weight, based on the total weight of the mixture including the positive electrode active material.

The binder has functions of keeping the positive electrode active material on the positive electrode current collector, and organically linking the positive electrode active materials, and examples thereof may include polyvinylidene fluoride, polyvinyl alcohol, carboxymethylcellulose, starch, hydroxypropylcellulose, regenerated cellulose, polyvinyl pyrrolidone, polytetrafluoroethylene, polyethylene, polypropylene, ethylene-propylene-diene rubber (EPDM), sulfonated-EPDM, styrene-butadiene rubber, fluoro rubber, various copolymers thereof, and the like.

The binder may be included in an amount of from 0.5% by weight to 30% by weight, based on the total weight of the mixture including the positive electrode active material. When the binder content is less than 0.5% by weight, physical properties of the positive electrode decline eliminating the active material and the conductor in the positive electrode, and when the content is greater than 30% by weight, a ratio of the active material and the conductor relatively decreases in the positive electrode reducing battery capacity.

When specifically examining a method for preparing the positive electrode of the present invention, the binder is dissolved in a solvent for preparing slurry first, and then the conductive material is dispersed thereinto. As the solvent for preparing the slurry, those capable of uniformly dispersing the positive electrode active material, the binder and the conductive material and readily evaporating are preferably used, and typical examples thereof may include acetonitrile, methanol, ethanol, tetrahydrofuran, water, isopropyl alcohol and the like. Next, the positive electrode active material, or selectively together with the additives, is uniformly dispersed again in the solvent into which the conductor is dispersed to prepare positive electrode slurry. The amounts of the solvent, the positive electrode active material, or selectively the additives included in the slurry do not carry an important meaning in the present application, and it is sufficient that the slurry has proper viscosity to be readily coated.

The slurry prepared as above is coated on the current collector, and the result is vacuum dried to form a positive electrode. The slurry may be coated on the current collector to a proper thickness depending on the slurry viscosity and the thickness of the positive electrode to form.

The current collector is not particularly limited as long as it may be prepared to generally have a thickness of from 3 µm to 500 µm, and has high conductivity without inducing chemical changes to a battery. Specifically, conductive materials such as stainless steel, aluminum, copper or titanium may be used, and more specifically, a carbon-coated aluminum current collector may be used. Using a carbon-coated aluminum substrate has advantages compared to using aluminum substrates without carbon coating in that adhesive strength for an active material is superior, contact resistance is low, and corrosion of aluminum caused by polysulfide is prevented. In addition, the current collector may have various forms such as films, sheets, foil, nets, porous bodies, foams or non-woven fabrics.

In addition, the present invention provides a lithium-sulfur battery including a positive electrode including the sulfur-carbon composite described above; a negative electrode; and an electrolyte liquid interposed between the positive electrode and the negative electrode.

The positive electrode is the positive electrode according to the present invention and is the same as described above.

The negative electrode may be formed with a current collector, and a negative electrode active material layer formed on one surface or both surfaces of the current collector. Alternatively, the negative electrode may be a lithium metal plate.

The current collector is for supporting the negative electrode active material, and is not particularly limited as long as it has excellent conductivity and is electrochemically stable in a voltage area of a lithium secondary battery. Examples thereof may include copper, stainless steel, aluminum, nickel, titanium, palladium, baked carbon, copper or stainless steel of which surface is treated with carbon, nickel, silver or the like, aluminum-cadmium alloys and the like.

The negative electrode current collector may strengthen binding strength with the negative electrode active material by forming micro unevenness on a surface thereof, and various forms such as films, sheets, foil, meshes, nets, porous bodies, foams or non-woven fabrics may be used.

As the negative electrode active material, a material capable of reversibly intercalating or deintercalating lithium ions, a material capable of reversibly forming a lithium-containing compound by reacting with lithium ions, lithium metal or a lithium alloy may be used.

Examples of the material capable of reversibly intercalating or deintercalating lithium ions may include crystalline carbon, amorphous carbon or a mixture thereof.

Examples of the material capable of reversibly forming a lithium-containing compound by reacting with lithium ions may include tin oxide, titanium nitrate or silicon.

Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

Between the positive electrode and the negative electrode described above, a separator may be additionally included. The separator separates or insulates the positive electrode and the negative electrode from each other, and enables lithium ion transfer between the positive electrode and the negative electrode, and may be formed with porous non-conductive or insulating materials. Such a separator may be an independent member such as a film, or a coating layer added to the positive electrode and/or the negative electrode.

Examples of the material forming the separator may include polyolefin such as polyethylene and polypropylene, glass fiber filter papers and ceramic materials, but are not limited thereto, and the thickness may be from approximately 5 µm to approximately 50 µm and preferably from approximately 5 µm to approximately 25 µm.

The electrolyte liquid is located between the positive electrode and the negative electrode, and includes a lithium salt and a non-aqueous organic solvent.

The concentration of the lithium salt may be from 0.2 M to 2 M, specifically from 0.6 to 2 M and more specifically from 0.7 to 1.7 M depending on various factors such as an accurate composition of the electrolyte liquid, solubility of the salt, conductivity of the dissolved salt, charge and discharge conditions of a battery, a working temperature, and other factors known in the lithium battery field. When the lithium salt concentration is used in less than 0.2 M, conductivity of the electrolyte liquid may decrease causing decline in the electrolyte liquid performance, and when the lithium salt concentration is used in greater than 2 M, viscosity of the electrolyte liquid increases leading to a decrease in the lithium ion mobility.

The lithium salt may be used without limit as long as it is commonly used in liquid electrolytes for a lithium-sulfur battery. Examples thereof may include at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, chloroborane lithium, lower aliphatic carboxylic acid lithium and the like.

As the non-aqueous organic solvent, those commonly used in an electrolyte liquid for a lithium secondary battery may be used without limit. For example, ether, ester, amide, linear carbonate, cyclic carbonate and the like may be used either alone or as a mixture of two or more types as the organic solvent. Among these, ether-based compounds are typically included.

Examples of the ether-based compound may include at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether, 1,3-dioxolane, tetrahydrofuran and 2-methyltetrahydrofuran, however, the ether is not limited thereto.

Examples of the ester as the organic solvent may include any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof, however, the ester is not limited thereto.

Specific examples of the linear carbonate may include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, however, the linear carbonate is not limited thereto.

Specific examples of the cyclic carbonate may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof.

Examples of the halide thereof may include fluoroethylene carbonate (FEC) and the like, but are not limited thereto.

In addition, N-methylpyrrolidone, dimethyl sulfoxide, sulfolane and the like may be used in addition to the above-described organic solvent.

In addition to the above-described compositions, the electrolyte liquid may further include nitric acid-based compounds commonly used in the art. Examples thereof may include lithium nitrate ($LiNO_3$), potassium nitrate ($KNO_3$), cesium nitrate ($CsNO_3$), magnesium nitrate ($MgNO_3$), barium nitrate ($BaNO_3$), lithium nitrite ($LiNO_2$), potassium nitrite ($KNO_2$), cesium nitrite ($CsNO_2$) and the like.

The electrolyte liquid may be injected at a proper stage in an electrochemical device manufacturing process depending on a manufacturing process and required properties of a final product. In other words, the electrolyte liquid may be used at a stage prior to assembling an electrochemical device or at a final stage of electrochemical device assembly.

The lithium-sulfur battery according to the present invention may go through lamination (stack) and folding processes of a separator and an electrode in addition to winding, a general process.

The shape of the lithium-sulfur battery is not particularly limited, and may employ various shapes such as a cylinder-type, a lamination-type or a coin-type.

In addition, the present invention provides a battery module including the lithium-sulfur battery as a unit cell.

The battery module may be used as a power supply of medium to large-sized devices requiring high-temperature stability, long cycle properties and high rate properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

Mode for Invention

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also belong to the scope of the attached claims.

EXAMPLE AND COMPARATIVE EXAMPLE

Example 1

To a solution dissolving polyurethane (Elastollan 1180A, product of BASF Corporation) in N-methyl-2-pyrrolidone in 1.5%, carbon nanotubes (1 g) were introduced, and the result was stirred for 12 hours at 80° C., washed and dried to form a polyurethane coating layer on a porous carbon material surface. Herein, the polyurethane:porous carbon material had a weight ratio of 2:8. Herein, the porous carbon material means a total weight of the carbon nanotubes.

After evenly mixing the polyurethane-coated porous carbon material (1.25 g) prepared above and sulfur (3 g), the result was heat treated for 30 minutes at 155° C. to prepare a sulfur-carbon composite including sulfur:porous carbon material:polyurethane in a weight ratio of 66:27:7.

After preparing slurry using the sulfur-carbon composite prepared as above in a weight ratio of the sulfur-carbon composite:conductive material:binder=92:3:5, the slurry was coated on an aluminum foil current collector having a thickness of 20 μm to prepare an electrode. Herein, carbon black was used as the conductive material, styrene butadiene rubber and carboxymethylcellulose were used as the binder.

Comparative Example 1

An electrode was prepared in the same manner as in Example 1 except that carbon nanotubes without forming the polyurethane coating layer were used.

Experimental Example 1. Evaluation of Charge and Discharge Properties

A lithium-sulfur battery coin cell was manufactured using each of the electrodes prepared in the example and the comparative example as a positive electrode, polyethylene as a separator, and lithium foil having a thickness of 150 μm as a negative electrode. Herein, the coil cell used an electrolyte liquid prepared by dissolving 1 M LiFSI and 1% LiNO3 in an organic solvent formed with diethylene glycol dimethyl ether and 1,3-dioxolane (DEGDME:DOL=6:4 (volume ratio)).

For the manufactured coin cells, capacity from 1.8 V to 2.5 V was measured using a charge and discharge measuring device (LAND CT-2001A, Wuhan LAND Electronics Co., Ltd., China). In addition, discharging capacity and Coulombic efficiency were measured by conducting a cycle of charging with a 0.1 C rate CC/CV and discharging with 0.1 C, 0.2 C and 0.5 C rate CC consecutively (CC: constant current, CV: constant voltage). The results obtained herein are shown in the following Table 1, FIG. 1 and FIG. 2.

TABLE 1

|  | Initial Charge and Discharge Capacity (mAh/g) | 0.2 C Discharge Capacity (mAh/g) | 0.5 C Discharge Capacity (mAh/g) |
| --- | --- | --- | --- |
| Example 1 | 1075 | 910 | 838 |
| Comparative Example 1 | 1019 | 800 | 738 |

Through Table 1, it was identified that charge and discharge properties of the coin cell including the positive electrode according to the present invention were superior compared to the comparative example.

Specifically, it was identified that capacity of the coil cell of Example 1 was enhanced compared to Comparative Example 1 as shown in Table 1 and FIG. 1.

Figure 2:
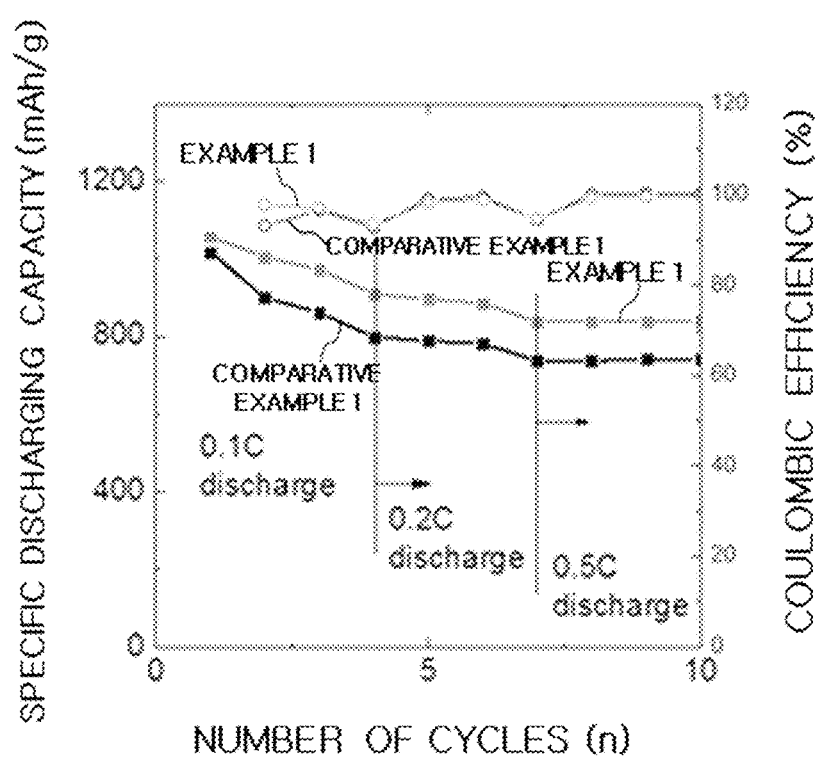
FIG. 2 is a graph showing discharge properties of a coin cell according to Experimental Example 1 of the present invention.

In addition, when examining Table 1 and FIG. 2, it was identified that, although Coulombic efficiency of Example 1 and Coulombic efficiency of Comparative Example 1 were similar, discharging capacity of the coin cell including the positive electrode of Example 1 was higher compared to Comparative Example 1 throughout the cycle, and a discharging capacity retention rate was improved. From the results, it was identified that performance and lifetime properties of a battery including the sulfur-carbon composite of the present invention were superior.

The invention claimed is:

1. A sulfur-carbon composite comprising:
   a porous carbon material;
   a coating layer comprising a polymer having electrolyte liquid loading capacity; and
   sulfur,
   wherein the coating layer is present on at least an inner surface of the porous carbon material and the coating layer is present between the sulfur and the porous carbon material; and
   wherein the polymer having electrolyte liquid loading capacity comprises polyurethane.

2. The sulfur-carbon composite of claim 1, wherein the coating layer-formed porous carbon material is mixed with the sulfur.

3. The sulfur-carbon composite of claim 1, wherein the polymer has an electrolyte liquid loading capacity of 50% or greater.

4. The sulfur-carbon composite of claim 1, wherein the polymer having electrolyte liquid loading capacity is present in an amount of from 0.1 parts by weight to 50 parts by weight, based on 100 parts by weight of the porous carbon material.

5. The sulfur-carbon composite of claim 1, wherein the porous carbon material comprises at least one selected from the group consisting of graphite, graphene, carbon black, carbon nanotubes, carbon fibers, natural graphite, artificial graphite, expanded graphite and activated carbon.

6. The sulfur-carbon composite of claim 1, wherein the sulfur comprises at least one selected from the group consisting of inorganic sulfur of formula $S_8$, $Li_2S_n$, wherein n≥1, disulfide compounds, organosulfur compounds and carbon-sulfur polymers of formula $(C_2S_x)_n$, wherein x=2.5 to 50, and n≥2.

7. The sulfur-carbon composite of claim 1, wherein a coating layer is present on both an inner surface of the porous carbon material and an outer surface of the porous carbon material.

8. The sulfur-carbon composite of claim 1, wherein the polyurethane is prepared through a reaction of a polyol and an isocyanate.

9. The sulfur-carbon composite of claim 8, wherein the polyol is selected from the group consisting of polyether-based polyols, polyester-based polyols, polytetramethylene ether glycol polyols, polyharnstoff dispersion (PHD) polyols, amine-modified polyols and mannich polyols.

10. The sulfur-carbon composite of claim 8, wherein the isocyanate is selected from the group consisting of hexamethylene diisocyanate (HDI), isophorone diisocyanate (IPDI), 4,4'-dicyclohexylmethane diisocyanate (H12MDI), polyethylene polyphenyl isocyanate, toluene diisocyanate (TDI), 2,2'-diphenylmethane diisocyanate (2,2'-MDI), 2,4'-diphenylmethane diisocyanate (2,4'-MDI), 4,4'-diphenylmethane diisocyanate (4,4'-MDI, monomeric MDI), polymeric diphenylmethane diisocyanate (polymeric MDI), ortho toluidine phenylmethane diisocyanate (TODI), naphthalene diisocyanate (NDI), xylene diisocyanate (XDI), lysine diisocyanate (LDI) and triphenylmethane triisocyanate (TPTI).

11. A positive electrode for a lithium-sulfur battery comprising the sulfur-carbon composite of claim 1.

12. A lithium-sulfur battery comprising the positive electrode of claim 11.

13. A method for preparing a sulfur-carbon composite according to claim 1, comprising the steps of:
   (a) coating a porous carbon material with a polymer having electrolyte liquid loading capacity and
   (b) mixing the porous carbon material coated with the polymer having electrolyte liquid loading capacity prepared in (a) with sulfur, and molding the result.

14. The method for preparing a sulfur-carbon composite of claim 13, wherein the step (b) includes mixing the porous carbon material coated with the polymer having electrolyte liquid loading capacity with sulfur and heating and molding the result.

* * * * *